M. G. KOPF.
SPRING LUBRICATING DEVICE.
APPLICATION FILED NOV. 6, 1915.

1,246,938.

Patented Nov. 20, 1917.

INVENTOR
Melrose G. Kopf.

BY
Edward L. Reid
ATTORNEY

UNITED STATES PATENT OFFICE.

MELROSE G. KOPF, OF DAYTON, OHIO, ASSIGNOR TO THE McCORMICK MANUFACTURING COMPANY, OF DAYTON, OHIO.

SPRING-LUBRICATING DEVICE.

1,246,938.

Specification of Letters Patent.

Patented Nov. 20, 1917.

Application filed November 6, 1915. Serial No. 59,916.

*To all whom it may concern:*

Be it known that I, MELROSE G. KOPF, a citizen of the United States, residing at Dayton, Ohio, in the county of Montgomery and State of Ohio, have invented certain new and useful Improvements in Spring-Lubricating Devices, of which the following is a specification, reference being had therein to the accompanying drawing.

This invention relates to the lubrication of springs, and more particularly to the lubrication of that type of vehicle spring which is composed of a plurality of super-posed members or leaves, and is commonly known as a "leaf spring."

The object of the invention is to provide means for securing and maintaining an adequate lubrication of the opposed surfaces of the leaves of such a spring. To this end it is a further object of the invention to interpose between the leaves of the spring a carrier which will retain the lubricant and prevent it from working out from between the leaves; which will distribute the lubricant uniformly along the bearing surfaces of the leaves; which will maintain an equal distribution of lubricant to all points of the bearing surfaces at all times; and in which the supply of lubricant can be readily renewed. It is also an object of the invention to provide a lubricant carrier which will tend to prevent the transmission of shocks and vibrations from one leaf to another and will thus increase the efficiency of the spring; and which will facilitate the distribution of load inequalities. Other objects and advantages will appear as the invention is described.

Figure 1:
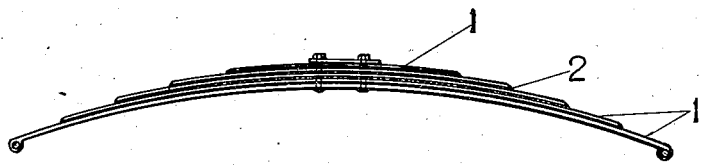
Figure 2:
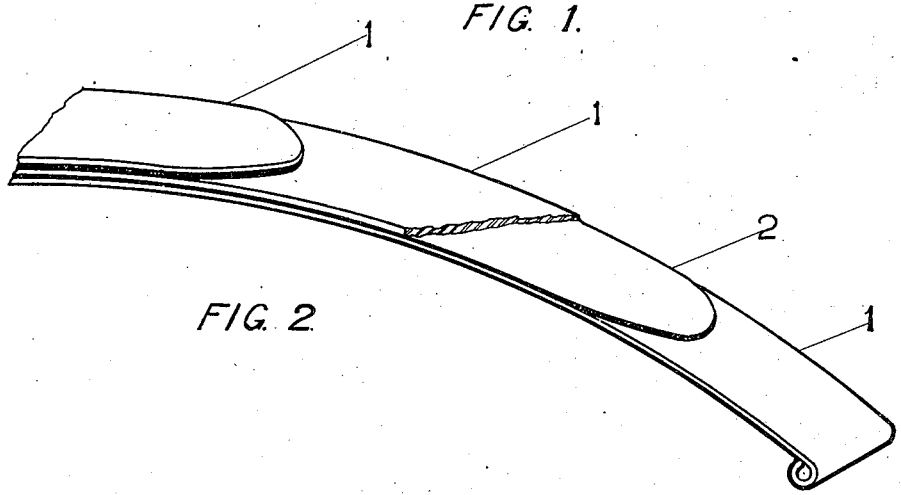
Figure 4:
Figure 3:
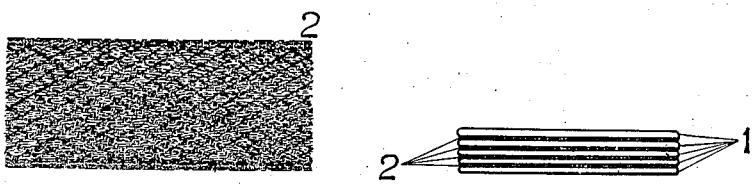

In the accompanying drawings, Figure 1 is a side elevation of a spring to which my invention has been applied; Fig. 2 is a perspective view of a portion of such a spring, partly broken away to show the manner in which the invention is applied to the leaves of the spring; Fig. 3 is a transverse sectional view of such a spring; and Fig. 4 is a detail view of a portion of the textile carrier.

In carrying out my invention, I interpose between the leaves of the spring a carrier for lubricant, which carrier is preferably both absorbent and compressible. The material best adapted for this purpose, so far as my tests have gone at this time, is a textile, such as cotton cloth or, preferably, a woven tape with its edges bound. This textile carrier is impregnated with a lubricant, such as graphite, vaseline, grease, or a suitable mixture of these or other lubricating materials. The lubricant may be applied to the textile carrier in different ways, but the most satisfactory method is to pass the strip of textile through the lubricant and then wind the same into a roll, in which condition it is readily handled and marketed. Preferably the length of the strip wound into each roll is sufficient for the complete lubrication of one spring or of a given number of springs of a specified size.

The width of the strip of textile is substantially equal to the width of the leaves of the spring, which are shown in the drawings at 1. The strip of textile, which is indicated by the reference numeral 2, is placed between the adjacent surfaces of the leaves of the spring, it being cut into lengths corresponding to the lengths of the leaves. The textile is of such thickness that when placed between the leaves of the spring and compressed, it adds very little to the thickness of the spring as a whole and does not render the spring unsightly or give it an objectionable appearance. The application of the lubricant carrier to the spring is a very simple operation and does not require any considerable amount of skill.

The carrier, being of an absorbent character, becomes saturated with the lubricant and the lubricant is thus carried to every part of the bearing surfaces of the leaves between which the carrier is interposed, and not only are these bearing surfaces themselves lubricated, but they are caused to act on the layer or strip of lubricating material, and in this manner the friction is very largely eliminated and the relative movement of the leaves of the spring is greatly facilitated, thus enabling the highest degree of efficiency to be obtained by the spring. Because of the absorbent character of the carrier, the lubricant is retained therein and is not permitted to escape from between the leaves of the spring.

When the pressure of the leaves on the carrier is greater at one point than at another, the lubricant which is forced out of that part of the carrier which is subjected to the greater pressure, is absorbed by the adjacent portions of the carrier which are subject to less pressure and in this manner the lubricant is prevented from being forced out from between the leaves and a substantially equal distribution of lubricant is maintained. At the same time this pressure causes an increased amount of lubricant to come into contact with those portions of the leaves which are bearing surfaces of the carrier, and thus provides an adequate amount of lubricant at the point where it is most needed. As soon as the pressure on the lubricant carrier again becomes uniform, the lubricant will again distribute itself through the carrier with substantial uniformity. It will also be apparent that the supply of lubricant in the carrier can be renewed from time to time without separating the leaves of the spring. This can be accomplished by applying the lubricant to the edge of the carrier where it is accessible along the edges of the leaves, either by means of a brush or by passing the spout of an oil can along the edge of the carrier. The lubricant should be applied when the spring is not under load and it will then be quickly absorbed by the carrier, and any portion of the lubricant which has adhered to the edges of the spring may be removed. The carrier being compressible serves, in addition to its function as a lubricating device, as a shock absorber and will to a considerable degree prevent the transmission of shocks and vibrations from one leaf of the spring to another, thus increasing the efficiency of the spring. Further this compressible carrier will serve to a certain extent to distribute load inequalities. Theoretically the weight should come upon the spring in a substantially vertically line at the center thereof, but in practice the spring is often subjected to a load or thrust at other points. The presence of the compressible textile between the leaves of the spring serves to distribute this thrust over a much larger surface than would otherwise be affected thereby, thus, not only securing greater efficiency of the spring but lengthening the life of the spring.

It has been proposed heretofore to utilize a carrier to support a lubricant between the leaves of a spring, but, so far as I have been able to ascertain, the carriers employed for this purpose were non-absorbent and non-compressible, such as wire fabric or fiber. Neither of these materials, because of their non-absorbent and non-compressible character, would have the advantages or produce the results above ascribed to my absorbent, compressible carrier.

While I have shown and described one embodiment of my invention, I wish it to be understood that I do not desire to be limited to the exact details shown and described, as various modifications will occur to a person skilled in the art.

Having now fully described my invention, what I claim as new, and desire to secure by Letters Patent, is:—

1. The combination with a spring comprising superposed leaves, of a compressible carrier containing a lubricant and arranged between adjacent leaves to enable the pressure of said leaves to force a portion of the lubricant from said carrier, at the point of pressure, onto said leaves.

2. The combination with a spring comprising superposed leaves, of a carrier arranged between adjacent leaves and containing a lubricant, said carrier being both compressible and absorbent to enable the pressure of said leaves to expel a portion of said lubricant from said carrier, at the point of pressure, onto said leaves and into adjacent parts of said carrier, and to enable that part of said carrier which has been compressed to absorb lubricant from the adjacent parts of said carrier when the pressure thereon has been relieved, thereby maintaining a substantially uniform distribution of the lubricant.

3. The combination with a spring comprising superposed leaves, of a strip of textile, impregnated with a lubricant, interposed between adjacent leaves of said spring and so arranged as to be subjected to varying pressures by the relative movements of said leaves.

4. The combination with a spring comprising superposed leaves, of an absorbent compressible textile carrier, impregnated with a lubricant, interposed between adjacent leaves of said spring, and so arranged as to be subjected to varying pressures by the relative movements of said leaves whereby an increased pressure by said leaves will cause a portion of the lubricant to be expelled from that part of said carrier which is subjected to said pressure and a decrease in pressure will permit said part of said carrier to absorb lubricant, thus applying lubricant at the point of pressure and maintaining a uniform distribution of lubricant in the carrier.

In testimony whereof, I affix my signature hereto.

MELROSE G. KOPF.